May 14, 1957     C. L. ROBINSON     2,791,922
POWER OPERATED TOOL WITH POSITIVELY CONTROLLED POWER FEED
Filed Aug. 15, 1955     9 Sheets-Sheet 1
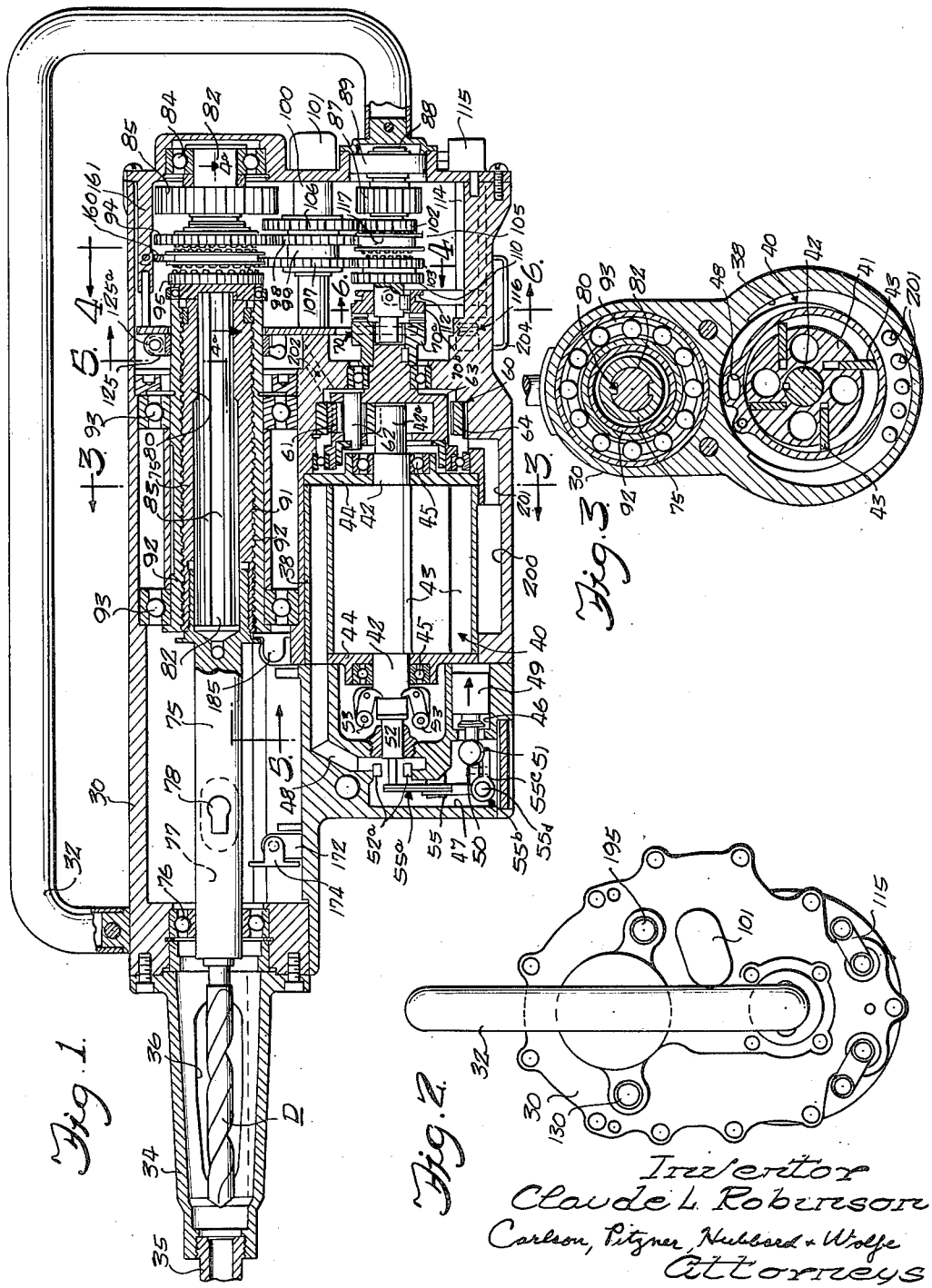
Inventor
Claude L. Robinson
Carlson, Pitzner, Hubbard & Wolfe
Attorneys May 14, 1957  C. L. ROBINSON  2,791,922
POWER OPERATED TOOL WITH POSITIVELY CONTROLLED POWER FEED
Filed Aug. 15, 1955  9 Sheets-Sheet 2
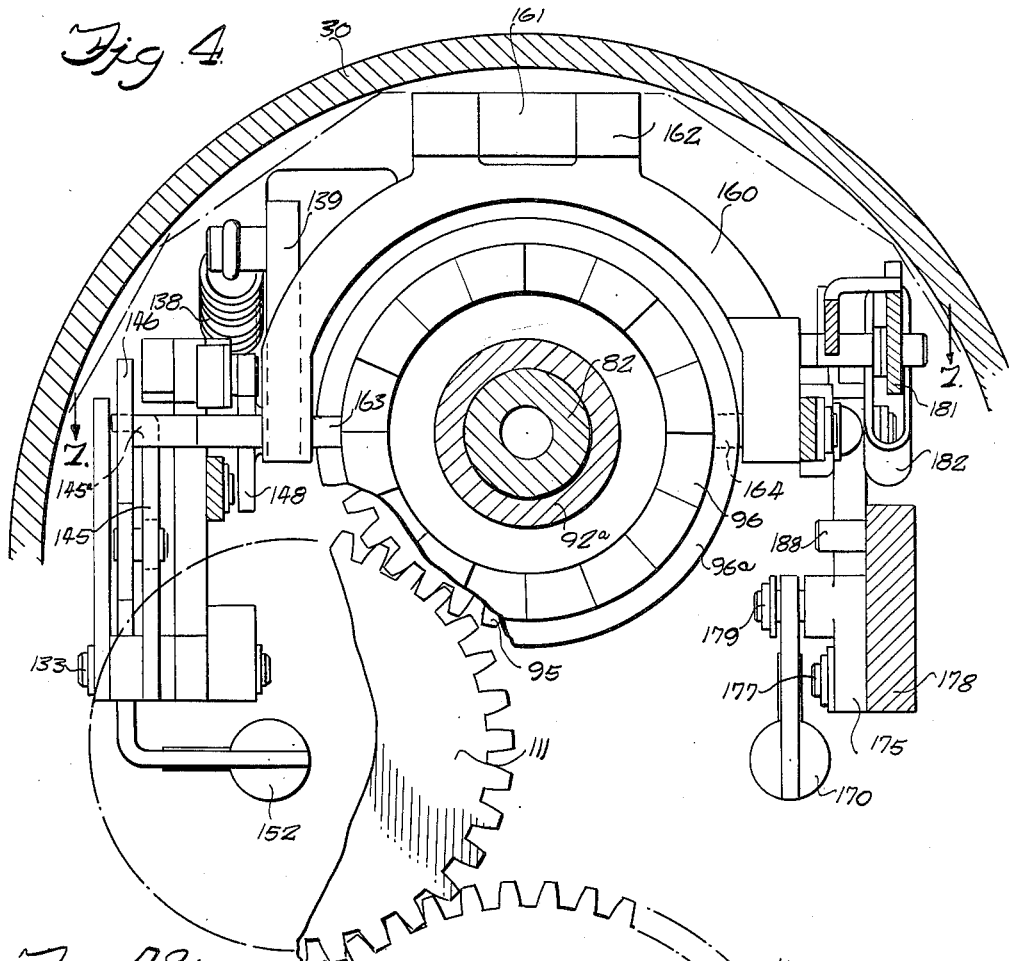
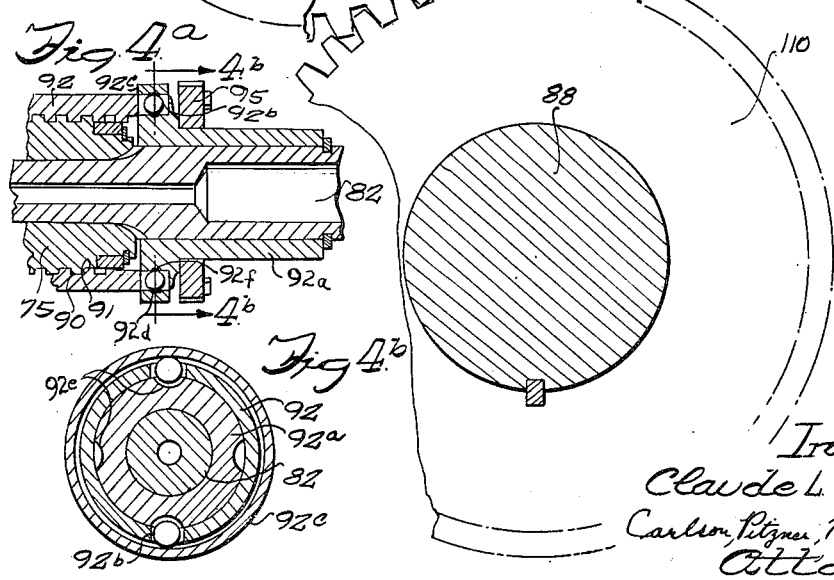
Inventor
Claude L. Robinson
Carlson, Pitzner, Hubbard & Wolfe
Attorneys May 14, 1957   C. L. ROBINSON   2,791,922
POWER OPERATED TOOL WITH POSITIVELY CONTROLLED POWER FEED
Filed Aug. 15, 1955   9 Sheets-Sheet 3

Inventor
Claude L. Robinson
Carlson, Pitzner, Hubbard & Wolfe
Attorneys

May 14, 1957    C. L. ROBINSON    2,791,922
POWER OPERATED TOOL WITH POSITIVELY CONTROLLED POWER FEED
Filed Aug. 15, 1955    9 Sheets-Sheet 6

Inventor
Claude L. Robinson
Carlson, Pitzner, Hubbard & Wolfe
Attorneys

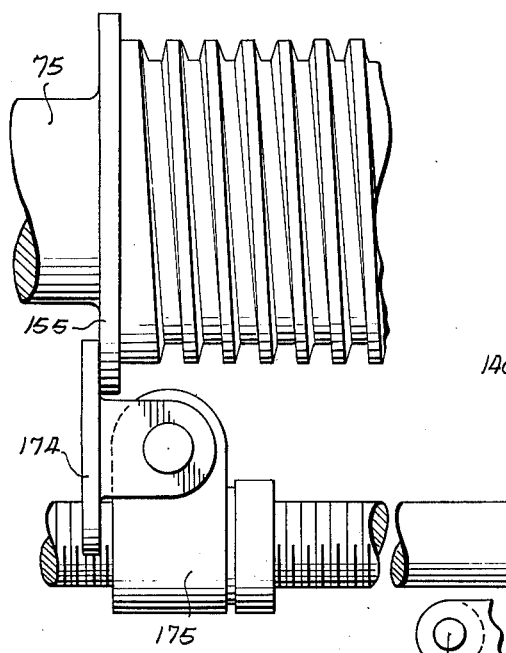
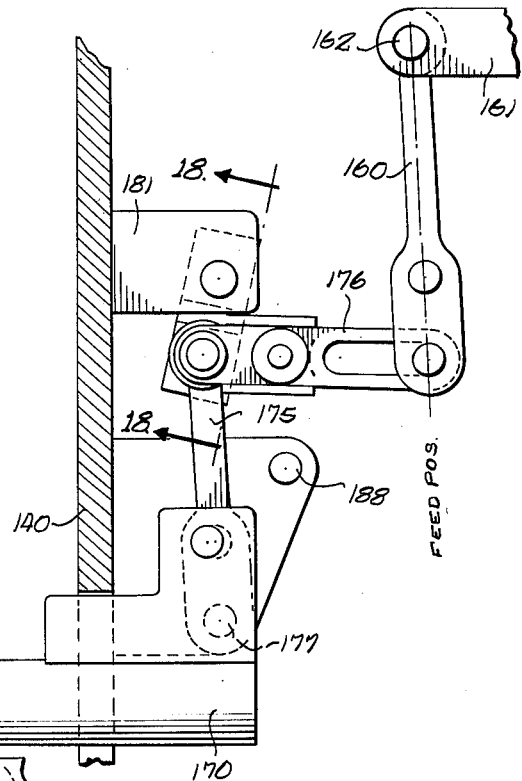
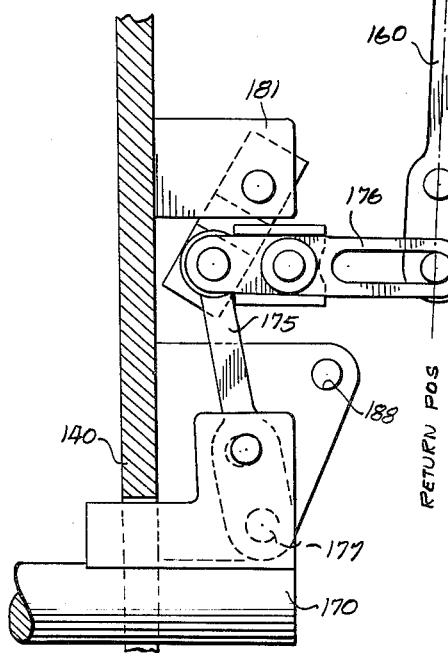
Fig. 13.
Fig. 14.
Inventor
Claude L. Robinson
Carlson, Pitzner, Hubbard & Wolfe
Attorneys

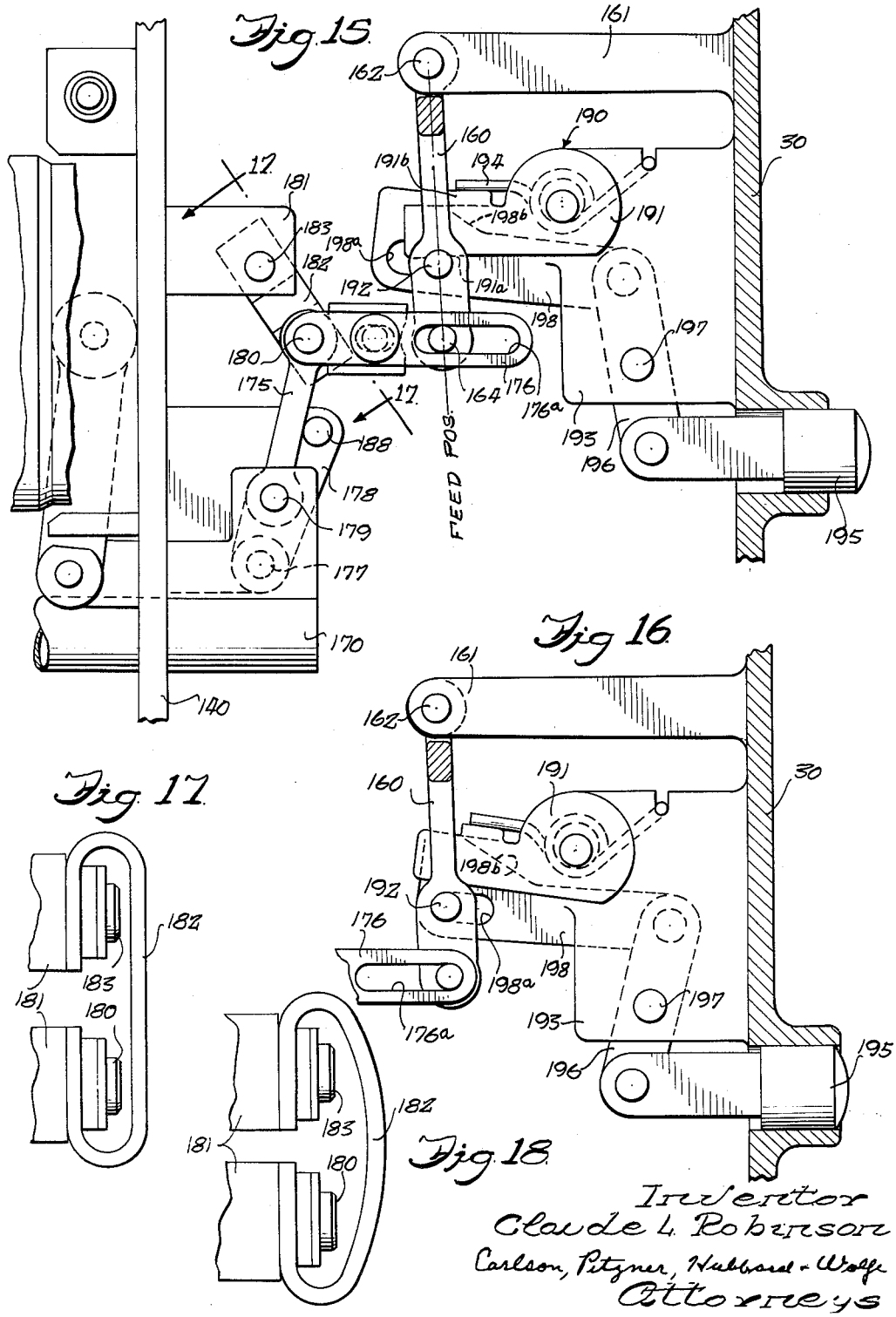

May 14, 1957  C. L. ROBINSON  2,791,922
POWER OPERATED TOOL WITH POSITIVELY CONTROLLED POWER FEED
Filed Aug. 15, 1955   9 Sheets-Sheet 9

Inventor
Claude L. Robinson
Carlson, Pitzner, Hubbard & Wolfe
Attorneys

United States Patent Office 2,791,922
Patented May 14, 1957

2,791,922

POWER OPERATED TOOL WITH POSITIVELY CONTROLLED POWER FEED

Claude L. Robinson, Spring Lake, Mich., assignor to Gardner-Denver Company, Quincy, Ill., a corporation of Delaware Application August 15, 1955, Serial No. 528,249

4 Claims. (Cl. 77—34.4)

The present invention relates generally to power operated tools of the type intended for drilling and similar operations and more particularly to the control of the tool's spindle in its movement both rotationally and longitudinally with respect to a workpiece.

In performing a cutting operation on materials of the so-called work hardening type, the substance of the material tends to acquire hardness ahead of the cutting element. Indeed it has been noted that during a cutting operation on some such materials the situation is not infrequently encountered wherein the portion of the material immediately ahead of the cutting element can increase in hardness from a degree well below that of the cutting element to a degree well beyond that of the cutting element. If the latter condition obtains then the cutting operation ceases. It is necessary therefore to prevent such cessation of the cutting operation, that the cutting element being used, such for example as a drill, must not only be positively rotated, but additional must be positively fed with respect to the work. That is to say, a point on the cutting edge of such a cutting element must advance with each successive rotation thereof so that the material of the work is removed and the cutting of the work proceeds.

It is a general object of the invention to provide in a tool of the foregoing general character simple, effective, and reliable means for positively controlling the movement of the tool's spindle substantially independently of the resistance to such movement offered by the work.

Another object of the invention is to provide such a power operated tool which is of small size, light weight, and which permits of embodiment as a portable unit adapted for readily mounting upon a jig or fixture, yet which at the same time is capable of positively feeding the tool element at the high thrusts that are required for performing cutting operations upon work hardening materials.

A more detailed object lies in the provision in a portable power operated tool of an improved drive mechanism for both rotating the tool's spindle and controlling the feed and return movements thereof according to preselected speed and feed rates and wherein individual components rotate unidirectionally and at approximately the same speeds. A related object is to provide a drive mechanism of the foregoing type embodying continuously meshed gears of exceedingly simple form.

The objects of the invention thus generally set forth together with other objects and ancillary advantages are attained by the construction and arrangement shown by way of illustration in the accompanying drawings, in which:

Figure 1 is a central longitudinal section through a power operated drilling tool embodying the features of the present invention and showing component relationship in neutral condition.

Fig. 2 is a rear elevation of the tool shown in Fig. 1.

Fig. 3 is a transverse section taken substantially in the plane of line 3—3 in Fig. 1.

Fig. 4 is a fragmentary transverse section taken substantially in the plane of line 4—4 in Fig. 1.

Fig. 4a is a fragmentary horizontal section taken substantially in the plane of line 4a—4a in Fig. 1.

Fg. 4b is a fragmentary transverse section taken substantially in the plane of line 4b—4b in Fig. 4a.

Figure 5:
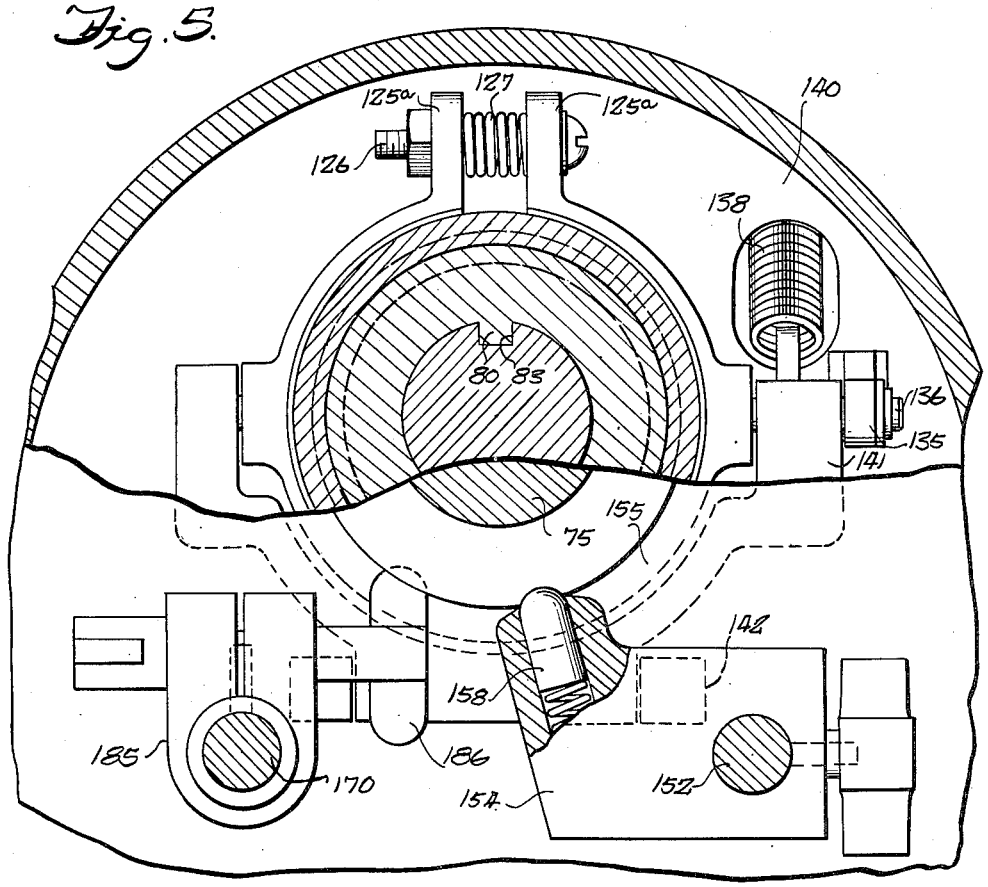

Fig. 5 is a fragmentary transverse section taken in offset planes as indicated by the line 5—5 in Fig. 1.

Figure 6:
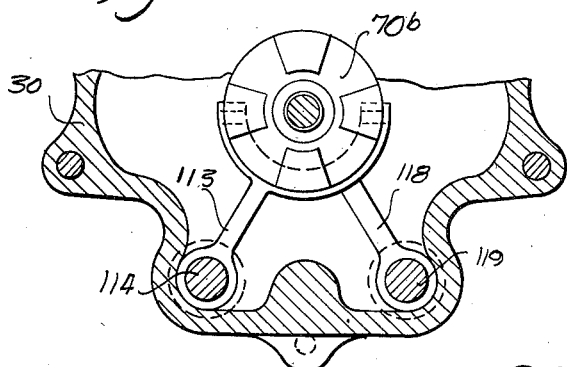

Fig. 6 is a fragmentary transverse section taken in offset planes as indicated by the line 6—6 in Fig. 1.

Figure 7:
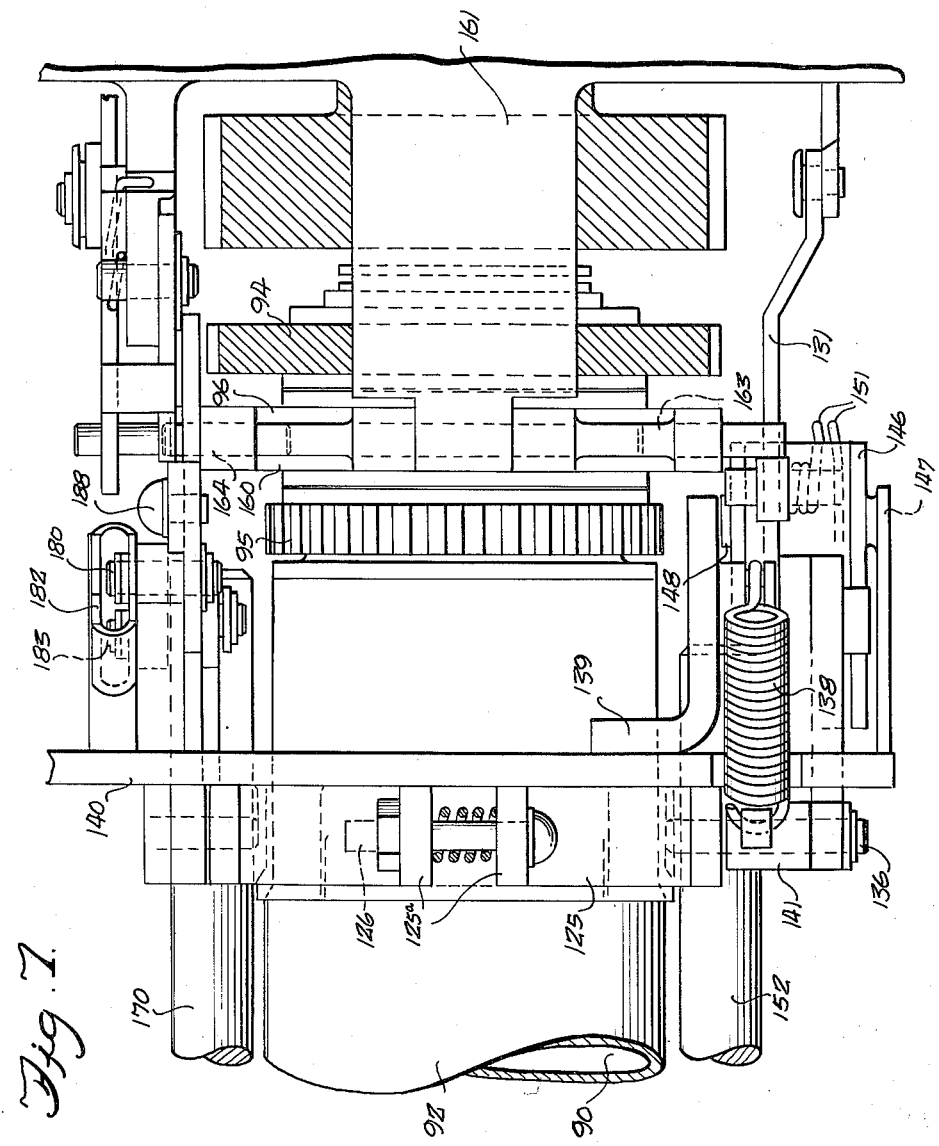

Fig. 7 is a fragmentary plan view taken substantially along the line 7—7 in Fig. 4.

Figure 8:
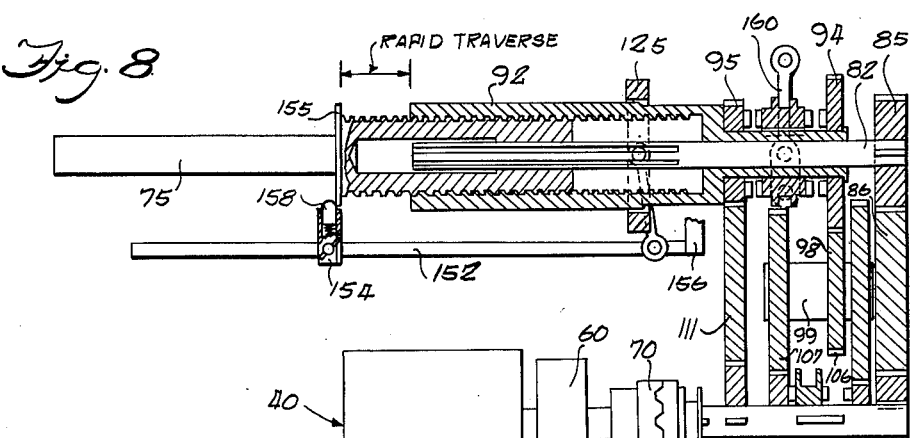
Figure 9:
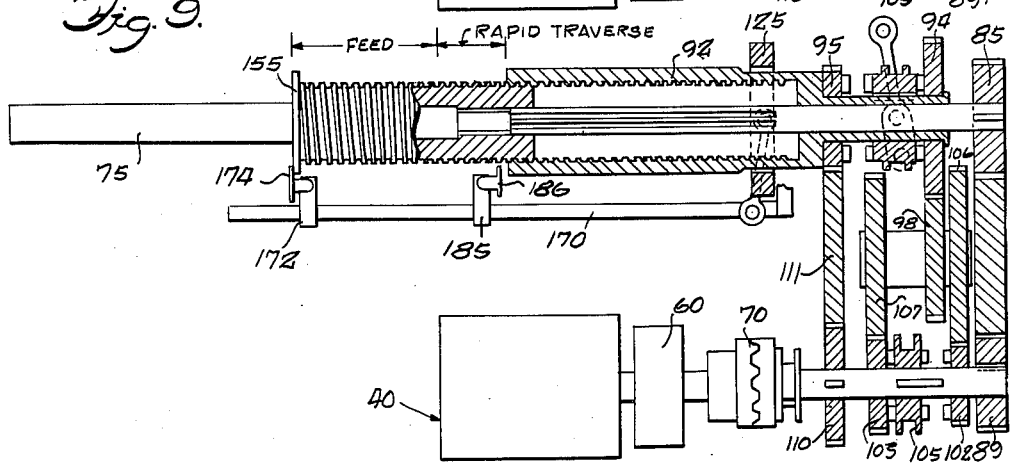
Figure 10:
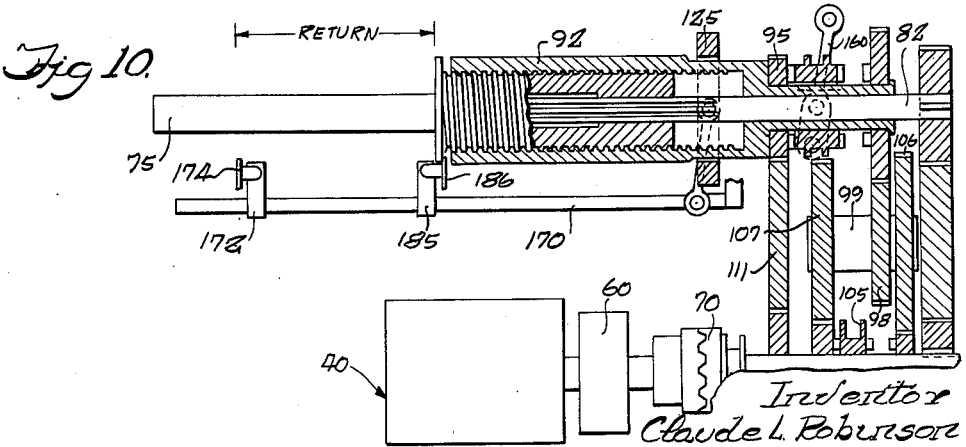

Figs. 8, 9 and 10 are diagrammatic views illustrating component relationships respectively for rapid traverse, feed, and return conditions of operation of the tool illustrated in the foregoing figures.

Figure 11:
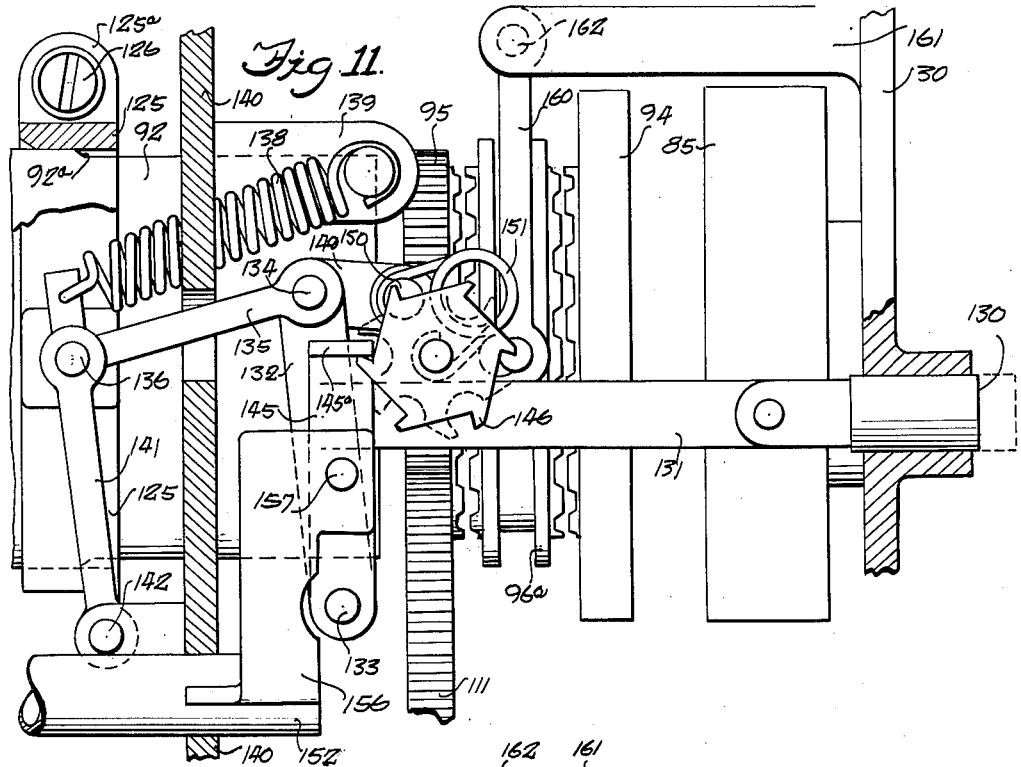
Figure 12:
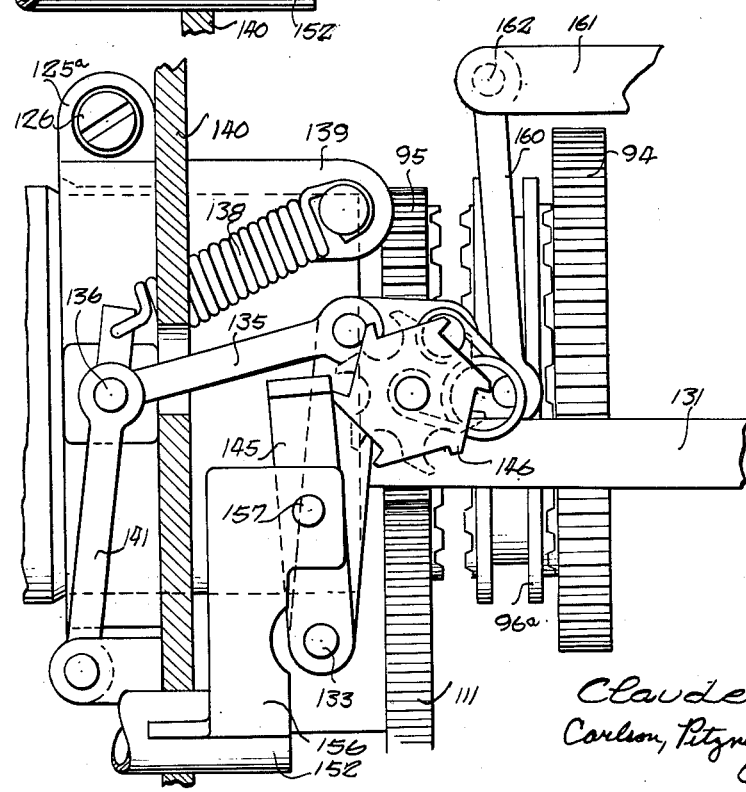

Figs. 11 and 12 are fragmentary side elevational views of a portion of the control mechanism for the illustrative tool.

Figs. 13, 14, 15 and 16 are side elevational views of another portion of the control mechanism of the illustrative embodiment of the present invention and show various component relationships for various conditions of operation of the tool.

Figs. 17 and 18 are fragmentary transverse sectional views taken substantially on the plane of line 17—17 of Fig. 15 and illustrate different relative positions of the components there indicated.

Figure 19:
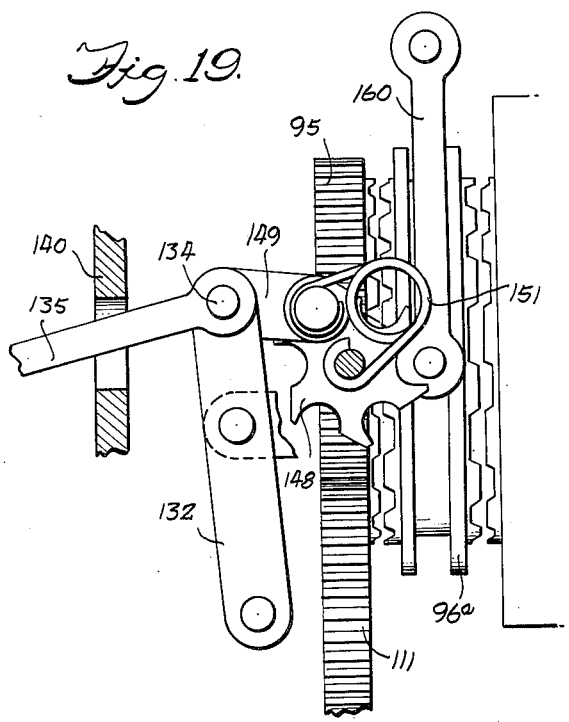
Figure 20:
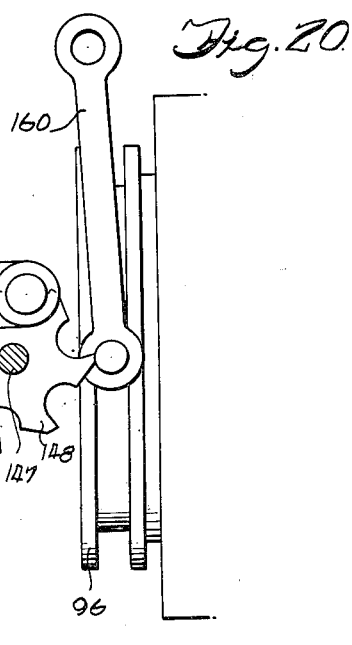

Figs. 19 and 20 are fragmentary elevational views of certain of the components illustrated in the preceding figures and showing the same and different positions of operation.

Figure 21:
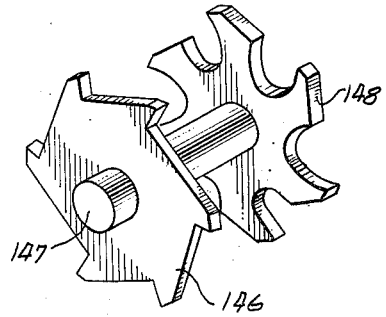

Fig. 21 is a perspective view of one element of the control mechanism.

While the invention is susceptible of various modifications and alternative constructions, there is shown in the drawings and herein will be described in considerable detail the preferred embodiment. It is to be understood, however, that it is not thereby intended to limit the invention to the specific form disclosed. On the contrary, it is intended to cover all modifications and alternative constructions falling within the spirit and scope of the invention as expressed in the appended claims.

Referring more particularly to the drawings, the form of the invention there shown for purposes of illustration is embodied in the tool of the type intended for performing drilling and like operations. The illustrative tool is of the portable type and includes the housing 30 enclosing the entire operative mechanism of the tool. The housing is equipped with a handle 32 for facilitating manipulation thereof. At its forward end the housing mounts a nose piece 34 which is adapted to accommodate a drill bushing tip 35 by means of which the tool can be readily mounted upon a jig or fixture. The nose piece is provided with access slots 36 to facilitate changing of the cutting element carried thereby and to permit chip clearance.

The instant tool is adapted for operation by a pressure fluid motor. Thus, within the lower central portion of the housing 30 there is provided a motor chamber 38. Within the motor chamber 38 is disposed the pressure fluid operated motor 40. The motor 40 is preferably of the rotary vane type and is adapted for actuation by the compressed air. Suffice it to say for present purposes, the motor includes a rotor 41 which is mounted upon a shaft 42. The rotor is equipped with extensible vanes 43 upon which compressed air acts to produce rotation. The motor shaft 42 extends through motor end plates 44 which additionally serve to support the shaft bearings 45.

In order to control the supply of air to the motor and to regulate its speed, the instant tool incorporates both a manually adjustable throttling governor valve 52 and an on-off air supply valve 49. Compressed air is supplied from any suitable source to an inlet supply chamber 46. Passage of air from the supply chamber to an air inlet chamber 47 is controlled by the on-off valve 49. Means are provided for opening and closing the on-off valve and in the present instance this is accomplished by means of a transverse actuator shaft 50 connected to an external finger piece and having thereon a cam surface 51 which engages the forward end of the valve 49. As the shaft 50 is rotated through a small arc, the valve is opened or closed depending upon the position of the cam surface, the shape of the surface and the proportions of the valve opening being such that the area of this opening is always larger than the opening of the throttling governor valve so that the speed of the tool is regulated by the latter and not by the on-off valve.

The throttling governor valve mechanism is designed to perform the dual functions of controlling the motor speed and compensating for operational motor speed changes. This valve mechanism includes a governor valve 52 which is adapted to be urged toward a closed position by the centrifugal force acting on flyweights 53 pivotally mounted on the forward end of the rotor shaft 42. As the governor valve moves in or out, the area between the valve and the ports 52a is varied thereby regulating the speed of the tool. The forward end of the governor valve engages a leaf spring attached to the outer end of the control lever 55. A wear plate 55a is provided on the leaf spring at the point of engagement with the valve. The control lever 55 is formed in the shape of a bell-crank and is mounted on a transverse shaft 55d. In order to control the position of the bell-crank lever 55 and thereby the position of the governor valve 52, the inner end of the lever is connected by an adjusting screw 55c to a short lever 55b which in turn engages a second cam surface (not shown) on the shaft 50. It can be seen, therefore, that the position of the shaft 50 as set by the operator will determine the axial position of the valve 52 and thereby control the amount of air supplied to the motor.

When the tool is in operation the governor valve 52 will be urged toward a given position with respect to the valve ports 52a by means of the spring end of the control lever 55 for any given angular setting of the control shaft 50. For example, at no load speed, the inner end of the control lever 55 will deflect until its spring resistance balances the centrifugal force of the flyweights 53 tending to close the valve 52. As a load is applied to the tool, such as during a drilling operation, the motor speed decreases and, since the centrifugal force of the flyweights also decreases, the spring end of the control lever will open the valve to supply more air to the motor. Conversely, as the speed of the motor increases under a decreased load, the governor valve will act to restrict the flow of the air between the valve 52 and the valve ports 52a, the force of the flyweights and the spring being balanced to give a constant motor speed. By changing the position of the control shaft 50, the spring tension force on the governor valve is changed to provide a manual control of the motor speed.

The rear end of the motor shaft 42 is formed as a sun gear 42a for a planetary speed reducing gear train indicated generally at 60. The gear train 60 includes planet gears 61 journaled on stub shafts 62 which are supported in a rotatable spider 63, and the planet gears rotate within a stationary external ring gear 64. The spider terminates at its rear end in a hub 65, which is journaled within a bearing 66 that is fixed within the housing 30, and mounts the driving element 70a of a clutch 70.

In order to effect its purpose of performing a cutting operation upon the workpiece, the tool is equipped with a spindle 75 for mounting a cutting element, such as a drill D, which is adapted to have imparted thereto both rotary and translatory motions. In carrying out the present invention both of these motions are derived from the single motor 40. Thus, there is provided a drive mechanism which effects rotation of the spindle and imparts positive longitudinal movement thereto. The drive mechanism accordingly includes means for imparting forward movement to the spindle at a rapid traverse rate, to continue forward motion at a slower feed rate, and upon completion of forward feeding movement to return the tool to a retracted position. Additionally, the drive mechanism is so formed that it permits of both automatic and manual actuation in changing the rate and direction of operation of the spindle. Further, the illustrative tool includes provision for effecting feeding movement alternatively at either of two selectable feed rates within a preselected range.

In the exemplary tool, the spindle 75 comprises a generally cylindrical axially elongated member. It is journaled in the housing 30 at its forward end in an antifriction bearing 76, and at its forward end the spindle is formed with an internal, axially-disposed, tapered recess 77 for the reception of the complementally tapered shank of the drill D. Spaced from its forward end is a transaxially disposed access opening 78 for the reception of a drift pin or the like to assist in the removal of the cutting element therefrom.

The rear portion of the spindle is fashioned in generally tubular form having immediately adjacent its rear end internal splines 80 for cooperation with a complementally formed drive shaft 82, the latter having longitudinal grooves 83 therein for the reception of the spindle splines 80. As can best be seen in Fig. 1 of the drawings, the spindle drive shaft 82 is journaled for rotation at its rear end in a bearing 84 mounted within the rear end portion of the housing 30. From the foregoing it will be seen that rotation imparted to the spindle drive shaft also causes rotation of the spindle. At the same time the spindle can move longitudinally with respect to the drive shaft.

In order to rotate the spindle drive shaft, and thus the spindle, a spur gear train is utilized in the illustrative tool. This spur gearing includes a relatively large terminal gear 85 mounted upon and fixed to the spindle drive shaft 82. The gear 85 is adapted to be driven through an intermediate idler gear 86 (Figs. 8, 9 and 10) by a terminal gear 87 mounted upon a stub shaft 88 which is journaled in a bearing 89 mounted in the lower rear portion of the housing 30. The forward end of the stub shaft 88 is equipped with the driven clutch element 70b of the motor clutch 70, the driven clutch element being axially shiftable but non-rotatively mounted thereon. Thus, when the motor clutch 70 is engaged the stub shaft 88 is rotated, rotating the driving spur gear 87 and intermediate idler gear 86, the spindle drive shaft gear 85, the spindle drive shaft 82 and the spindle 75 and, of course, a cutting element such as the drill D mounted in the spindle.

To impart translatory motion to the spindle so as to extend and retract the same, the exemplary tool employs a differential screw mechanism. Thus, the spindle has an external screw thread 90 formed thereon on its rear end portion for cooperation with a complemental internal thread 91 formed in a sleeve 92. The sleeve 92 is journaled in the housing 30 in spaced bearings 93 and is adapted to be rotated by the drive mechanism of the instant tool at speeds less than, equal to, or greater than that at which the spindle is rotated. The difference in these speeds—or differential—serves to determine the rate and direction of movement of the spindle with respect thereto. At the same time this mechanism provides positive mechanical feed, which feed because of the character of these membemrs, will be consistent for each revolution of the spindle. It will be apparent to one skilled in the art that with the spindle rotating at a constant speed, if the sleeve 92 is rotated at a speed less than that at which the spindle 75 is rotating, then the spindle will advance with respect to the sleeve. Conversely, if the sleeve is rotating at a rate greater than that at which the spindle is rotating, the spindle will be retracted.

To impart rotary motion to the sleeve 92 it has yieldingly connected with its rear end a tubular extension 92a having rotatably mounted thereon, and in spaced relation to each other, the terminal gears 94 and 95 of a pair of gear trains. The sleeve extension 92a (Fig. 4) has keyed thereto intermediate its ends a clutch member 96 for selectively coupling either of the gears 94 or 95 to the feed sleeve.

Under some conditions of operation, the cutting tool may jam in the work and prevent the rotation of the tool. Provision is made for preventing damage to the motor and gear mechanisms when such conditions occur. This is accomplished by providing a shoulder on the forward end of the sleeve extension 92a which is adapted to fit within a recess at the rear end of the sleeve 92 as can be seen in Figs. 4a and 4b. The rear end of the sleeve 92 is formed with two notches adapted to receive two steel balls 92b which are retained in the notches by a spring collar 92c having a shallow raceway 92d to receive the balls. The shoulder on the forward end of the extension 92a has four axial grooves 92e and a shallow raceway 92f on its outer surface connecting the four grooves. When the shoulder of the sleeve extension is inserted into the extension recess, the steel balls 92b rest in a pair of the grooves in the former and thereby form a yieldable connection between the extension and the sleeve. Should the drill D break or the spindle 75 be accidentally jammed during tool operation, damage to the tool is prevented by a slipping action between the sleeve 92 and the sleeve extension 92a. During this slipping action the balls ride up on the races between the four grooves 92e of the extension 92a. This action prevents damage to the tool while still providing for a reliable mechanical driving connection without slippage for normal thrust loads on the spindle 75.

In the illustrative drive mechanism the rearmost gear 94 is the terminal gear of what may be termed the "feed" gear train. It is adapted to be driven by an idler gear 98 which is fixed intermediate the ends of a hollow shaft 99, the latter being journaled for rotation upon a stud 100 which in turn is fixed in a boss 101 formed in the rear portion of the housing 30. As noted above, the instant device makes provision for the operator to preselect either of two feed rates. Thus, the driving gears for the feed gear train include a pair of spur gears 102 and 103 which are rotatably mounted upon the stub shaft 88 intermediate the ends thereof. The gears 102 and 103 are disposed in spaced relation to each other and between them and fixed to the shaft 88 is a feed selector clutch 105 for alternatively coupling the shaft 88 to either of the two feed drive gears. The idler gear shaft 99, therefore, has fixed thereto intermediate or idler gears 106 and 107 which respectively mesh with the drive gears 102 and 103. It will be apparent that with the feed selector clutch 105 in its forward position, rotary motion is imparted to the feed drive gear 103 and, by way of the idler 107 and the shaft 99, to the intermediate gear 98 and thence to the terminal driving gear 94, and from it by way of the clutch 96 to the feed sleeve 92. Alternatively, with the feed selector clutch 105 in its rearmost position, rotary motion is imparted from the shaft 88 by way of the clutch 105 to the feed drive gear 102 and by way of the idler gear 106 to the idler gear shaft 99, the gear 98, to the driving terminal gear 94 of the feed gear train and thence to the feed sleeve 92 by way of the forward and return clutch 96.

Both the terminal driving gears 94 and 95 and the drive gears 102 and 103 are spaced apart sufficiently so that both the forward and return clutch 96 and the feed selector clutch 105 have intermediate or neutral positions.

With the forward and return clutch 96 in its forward position so as to couple the terminal gear 95 to the feed sleeve, the feed sleeve 92 is rotated at a speed considerably greater than that of the spindle 75 so as to impart return movement to the spindle. Thus, the instant drive mechanism employs a return gear train which includes a return drive gear 110 mounted adjacent the forward end of the stub shaft 88. This drive gear is keyed to the shaft 88 and rotary motion imparted thereto is transmitted to the terminal sleeve driving gear 95 through return idler gear 111 (Fig. 4), when the clutch 96 is in "return" position. It will be apparent that although the gears 95, 111 and 110 rotate continuously when the shaft 88 rotates, this does not effect rotation of the sleeve 92 until the clutch 96 is shifted into its return position so as to couple the gear 95 to the sleeve 92.

From the foregoing it can be seen that rotation of the spindle is effected by the motor 40 by way of the motor clutch 70, stub shaft 88, gear train 87, 86 and 85, and the spindle drive shaft 82; and that translatory or longitudinal movement of the spindle is effected by rotation of the feed sleeve 92 relative to the spindle 75 with the rate of such movement being determined by the difference between the speeds of rotation of the spindle and feed sleeve. Further, there has been detailed above the elements of the drive mechanism of the instant tool whereby sleeve rotation is effected, that is to say, the gearing including the various clutches by means of which rotation of both the spindle and sleeve obtains.

It will be apparent to one skilled in the art that clutch operation between the various alternative positions thereof must be controlled in order to effect the operation of the device as above described. Certain of the clutches need to be operated only manually and others of them are desirably both manually and automatically shifted.

The motor clutch 70 is constructed and arranged for manual operation between its engaged and disengaged positions. For this purpose the driven clutch element 70b, which is longitudinally movable on the stub shaft 88 but non-rotatably secured thereto, is provided with an annular groove 112 for the reception of a generally Y-shaped operator 113 so as to form a rotative connection therewith. The operator 113 is fixed at its lower end to a push rod 114 which is longitudinally shiftable in the lower rear portion of the housing 30. The outer or rear end of the rod is equipped with a fingerpiece 115 to permit manual movement thereof and thus of the operator 113 and the driven clutch element 70b. In order to retain the push rod, the operator, and clutch element in either engaged or disengaged position, detent means indicated generally at 116 is provided.

Similarly, the feed selector clutch 105 is arranged for manual operation. The feed selector clutch has the driven elements thereof comprising teeth formed on the oppositely disposed faces of the driving gear elements 102 and 103 respectively. The driving element of the clutch comprises a disc having complementally formed teeth on its opposite faces for alternative engagement with the afore-mentioned gear teeth and this element is longitudinally shiftable and non-rotatively secured to the stub shaft 88. It is provided with an annular groove 117 in its periphery for the reception of the upper ends of the legs of a Y-shaped operator 118 (Fig. 6), the lower end of which is fixed to a push rod 119 which is disposed in the lower rear portion of the housing 30 beside the push rod for the motor clutch 70. The feed selector clutch push rod 119 is also adapted to cooperate with detent means 120 so as to retain the same in the desired preselected one of its alternative positions.

As hereinbefore noted, in order to obtain forward longitudinal movement of the spindle with respect to the housing 30, the spindle 75 is rotated at a speed in excess of the speed of rotation of the feed sleeve 92. It is desirable that there be not only forward movement at feed rate but that there be in addition available in the tool forward movement at a faster or rapid traverse rate so as to permit rapid movement of a cutting element such as the drill D from its retracted position up to the point at which it is to engage the work. In order that this relatively greater speed differential between the spindle and the sleeve obtain, the instant drive mechanism incorporates means for braking the feed sleeve 92. In the present instance the brake means includes a collar 125 which is adapted to be moved between a disengaged and an engaged position with respect to the feed sleeve 92. The collar 125 surrounds the sleeve 92 adjacent the rear end thereof adjacent a shoulder 92a formed on the sleeve (Fig. 7). In its forward position the collar 125 is adapted to ride up on the shoulder 92a, and in its disengaged position is adapted to be disposed rearwardly thereof. The collar is of expandable construction and thus is of split form and includes a pair of upstanding ears 125a which are apertured for the reception of a through-bolt 126 which serves the dual function of limiting the amount of expansion permissible and to support between the ears an expansion type biasing spring 127 (Fig. 5).

Means is provided for manually initiating the cycle of operation which includes rapid traverse, then slow feed, then return and stop. To effect the first phase of this cycle of operation, means is provided for applying the brake 125 to the feed sleeve 92. Assuming that the clutch 70 is engaged so that the spindle drive shaft 82 and the spindle are rotating, the brake is applied to the feed sleeve by forward movement thereof with respect to the sleeve by the operation manually of a push-button 130, which may be termed the "cycle start button" (Figs. 11 and 12). The push button 130 is formed on the rear end of a push rod 131, the forward end of which is pivoted intermediate the ends of an upstanding lever 132. The lever 132 is pivoted at its lower end on the housing 30 at 133. The upper end of the lever 133 carries a pin 134 to which is pivoted a connecting link 135, the forward end of which is connected to a trunnion 136 which extends laterally from the brake collar 125. The brake collar is normally biased into disengaged position with respect to the feed sleeve 92 by means of a spring 138. The spring 138 extends between the rear end of a bracket 139, which is supported by a transverse mounting plate 140, and the upper end of an arcuate lever arm 141. The latter is connected intermediate its ends on the brake collar trunnion 136 and at its lower end on a transversely disposed stud 142 also carried by the plate 140.

In order to hold the brake collar 125 in engaged position with respect to the feed sleeve latch means is provided. In the illustrative tool the latch means includes a pawl 145 having a laterally extending finger 145a which is engageable with the teeth of a latch wheel 146. The latch wheel 146 is mounted upon a transverse shaft 147 which has rigid with the opposite end thereof a sprocket 148. The latch wheel 146 is biased in engagement with the latch 145 by the spring 138 acting through the arm 141, connecting link 135, an intermediate link 149, the sprocket 148 and the shaft 147. The biasing force is applied from the link 149 to the sprocket 148 by means of a pin 150 carried by the link and engageable with the teeth of the sprocket, the pin being biased into tooth engaging relation by a spring 151.

From the foregoing it will be understood that the brake 125 is latched in braking engagement with the sleeve 92 and remains in this position until the latch 145, 146 is released. Therefore, the feed sleeve 92 is held against rotation and with the spindle 75 being driven, forward movement of the spindle at rapid traverse rate obtains.

To determine the amount of forward movement which is to take place at the rapid traverse rate means operable at a preselected point in the movement of the spindle is provided for effecting release of the brake 125 from engagement with the spindle feed sleeve 92 and at the same time for shifting the feed and return clutch 96 from its "neutral" position into its "feed" position. The latter position as previously set forth comprises its rearmost position as shown in the accompanying drawings wherein the feed sleeve driving gear 94 is coupled to the feed sleeve. For this purpose the tool is equipped with a control rod 152 which extends longitudinally of the housing 30 alongside the spindle 75. The control rod mounts a stop 154, which is adjustable in position along it as desired, and which is adopted for engagement by an annular shoulder 155 formed intermediate the ends of the spindle 75. At its rear end the control rod 152 carries an upstanding arm 156 which is connected to the latch 145 by means of a pin-in-slot connection indicated at 157.

It will be apparent that upon engagement of the spindle shoulder 155 with the stop 154, the latter is moved forwardly and with this forward movement the latch 145 is pulled out of engagement with the latch wheel 146. Since but a small amount of movement is necessary to effect this result, and since the spindle is to continue its forward movement the stop 154 is equipped with yieldable detent means 158 which permits passage of the spindle shoulder beyond the stop 154 (Fig. 8).

Upon release of the latch 145, 146 the sprocket 148, which is rigid with the same shaft 147 as the latch wheel 146, is rotated in a clockwise direction (Figs. 11, 12) by the force of the brake biasing spring 138, acting through the linkage 141, 136, 135, 149 and 150, as it withdraws the brake collar 125 from engagement with the feed sleeve 92. It will be noted that rearward movement of the brake collar 125 is limited by its engagement with the mounting plate 140 (Fig. 12).

As can best be seen in Figs. 1, 4 and 11, the feed and return clutch 96 is adapted to be shifted longitudinally along the feed sleeve extension 92a by means of a yoke 160. The yoke 160 is pivoted at its bight upon a plate 161 as indicated at 162, the plate being rigid with the rear end portion of the housing 30. At the lower ends of the legs of the yoke 160 are provided inwardly projecting pins 163, 164 for engagement with an annular groove 96a formed in the clutch element 96.

In order to shift the feed and return clutch 96 into feed position, the clutch yoke pin 163 is extended laterally outward into the path of movement of the teeth of the sprocket 148. As the sprocket is rotated, as above set forth upon release of the latch 145, 146, the pin and yoke are swung rearwardly and with such movement the clutch 96 is urged into engagement with the feed sleeve driving gear 94, thereby coupling the latter to the feed sleeve 92. As a result, the feed sleeve is driven to the end that the spindle 75 is fed forwardly at slow feed rate as determined by the speed differential therebetween.

Means is provided for limiting the forward stroke of the spindle 75 and thus of the cutting element D carried thereby. To this end the illustrative tool incorporates a second control rod disposed in longitudinal relation within the housing 30 parallel to and spaced laterally from the control rod 152. The second control rod, to which the reference number 170 is applied, is equipped adjacent its forward end with a forward stroke limit stop 172. The stop 172 is screw threaded upon the rod 170 so as to permit longitudinal adjustment therealong whereby stroke length adjustment obtains. The stop 172 mounts a stop finger 174 which is arranged in the path of movement of the spindle collar 155 so as to be engaged thereby at the forward end of the spindle stroke as determined by the setting of the stop 172 along the control rod 170. Upon engagement of the collar 155 with the stop finger 174, the control rod 170 is moved forwardly. This motion is transmitted through a suitable linkage to the feed and return clutch yoke 160 whereby the driving connection between the clutch 96 and the feed sleeve driving gear 94 is interrupted. Since, when the forward stroke limit of the spindle and the cutting element D carried thereby is completed, it is desirable to withdraw the cutting element D from the work, the means provided for effecting the disengagement of the feed and return clutch 96 from the gear 94 is also, in the present instance, effective to shift the clutch element 96 into its forward position wherein the return gear 95 is coupled to the feed sleeve to the end that the sleeve is rotated at a speed greater than that of the spindle 75 whereby the latter is retracted. Referring particularly to Figs. 13 through 18 inclusive, it will be seen that forward movement of the control rod 170 is transmitted to the feed and return clutch yoke 160 by a linkage including an upstanding link 175 and a longitudinally disposed link 176. A lost motion connection is provided between the link 176 and the yoke 160. To this end the link 176 has formed in its rear end portion a slot 176a within which is received the outer end of the pin 164 (the inner end of which is received in the clutch groove 96a). In rapid traverse position the pin 164 occupies the forward end of the slot 176a. In feed position the pin 164 occupies a position spaced from the forward end of the slot 176a. It will be apparent from the drawings that in order to disengage the clutch element 96 from the gear 94 it must be moved forwardly. Thus, the linkage including the links 175 and 176 is so arranged that upon forward movement of the control rod 170 the link 176 is moved forwardly until the pin 164 is engaged by the rear end of the slot 176a and further movement is effected whereby to move the pin 164, and thus the yoke 160 and the clutch element 96, from its rearmost position wherein it is engaged with the teeth formed on the forward face of the gear 94 not only into neutral position but through such position so as to effect engagement between the clutch element 96 and the return gear 95. It is desirable too that this motion comprise what might be termed "snap action." To this end the lever 175 is pivoted at its lower end upon a pin 177 which projects laterally from a bracket 178 mounted upon the transverse plate 140, and the control rod 174 is connected to the lever 175 by means of a pivot pin 179 which is spaced above the pin 177. Interposed between a pin 180, by means of which the links 175 and 176 are pivotally connected together, and another bracket 181, which extends rearwardly from the plate 140, is an arcuate leaf spring 182, the upper end thereof being pivoted to the bracket 181 upon a pin 183. It should be noted that lost motion is provided in the connection between the pin 179 and the lever 175. From the foregoing and especially upon reference to Figs. 15, 13 and 14, it will be seen that forward movement of the control rod 170, as occasioned by the engagement of the collar 155 with the stop finger 174, causes forward movement of the pin 179 so as to initiate counterclockwise movement of the lever 175. This movement initially causes relative movement of the link 176 with respect to the pin 164 so that the pin 164 is engaged by the rear end of the slot 176a. Such counterclockwise movement also causes clockwise swinging movement of the spring 182 about the pin 183. More particularly this latter movement causes a bringing toward each other of the pins 180 and 183 with the result that the spring 182 is tensioned (Fig. 18). As soon as the pin 180 has passed beneath the pin 183, i. e. a dead center position, the spring 182 can then expand and upon such expansion the spring 182 snaps the link 175 into its forwardmost position as shown in Fig. 14. With such movement of the link 175, link 176 too is drawn forwardly and by it the pin 164, the yoke 160 and the feed and return clutch 96 are snapped into their forwardmost positions wherein the clutch 96 is engaged with the return gear 95.

As a result of such operation of the clutch 96, the return gear 95 is operatively connected to the feed sleeve 92 and the latter is rotated at a speed in excess of that at which the spindle 75 is rotated. Thus, the spindle is retracted and with it the cutting element D is withdrawn from the work.

Means is provided to interrupt return movement by effecting disengagement of the clutch 96 from the gear teeth formed on the rear face of the return driving gear 95. For this purpose the control rod 170 has disposed thereon in rearwardly spaced relation from the stop 172 the return stop 185 which is equipped with a finger 186 having a portion thereof disposed in the path of movement of the collar or shoulder 155 of the spindle 75 so as to be engaged thereby during its return stroke. Thus, upon engagement of the collar 155 with the finger 186 of the stop 185, the control rod 170 is moved rearwardly. Such rearward movement of the control rod 170 results in the initiation of clockwise movement of the link 175. As a result the pin 180 is moved rearwardly beneath the pin 183 and the spring 182 is again compressed as shown in Fig. 18. As this rearward motion continues, so that the pin 180 is moved through a dead center position, the spring 182 can again expand and upon so doing swings the link 175 and with it the link 176 rearwardly. Such rearward motion of the link 176 causes the slot 176a to be moved rearward with respect to the yoke pin 164 thereby effecting disengagement of the clutch 96 from the return driving gear 95.

It will be recalled that movement of the link 175 and the link 176 by the spring 182 is a snap action and thus takes place with considerable rapidity. By the time rearward movement of the control rod 170 as occasioned by engagement between the spindle shoulder 155 and the finger 186 of the stop 185 is completed, the disengaging action of the clutch 96 from the return driving gear 95 is completed. It is desirable that this disengagement movement terminate with the clutch 96 in its neutral position. Thus, the bracket 178 is provided with a stop pin 188 which projects laterally into the path of rearward movement of the link 175 and serves to limit the rearward or rest position of the link 175 so as to leave the pin 164 and thus the yoke 160 in neutral position, in which position the pin 164 is spaced rearwardly from the forward end of the notch 176a of the link 176. Thus, the control mechanism is conditioned for the initiation of a succeeding cycle of operation, as hereinbefore described by pressing the start button 130.

To hold the yoke 160 and, in turn, the clutch element 96 in rearmost or feed position, the instant tool incorporates detent means indicated generally at 190 (Figs. 15, 16). This means includes a latch arm 191 which is engageable with a latch pin 192 carried by the yoke 160. The arm 191 is pivoted at 193 upon a bracket 193 which is rigid with the rear portion of the housing 30. Interposed between the bracket 193 and the arm is a biasing spring 194 which serves to urge the arm 191 into engagement with the pin 192, and the arm is provided with a notch 191a for the reception of the pin 192 when the yoke 160, and thus the clutch element 96, is in feed position. Preferably the notch 191a is relatively shallow and is provided with rounded corners so that while the detent means 190 exerts a holding or retaining force upon the yoke and clutch element, yet the pin 192 can be relatively easily withdrawn from the notch 191a and positive shifting of the clutch element 96 from feed position is readily effected as hereinbefore set forth.

For some operations to be performed by a tool of this general type, it is desirable that forward movement at feed rate be effected without any forward movement at rapid advance rate. For this purpose means is provided for manually shifting the clutch element 96 from its intermediate or neutral position, wherein it was left upon completion of the preceding return stroke of the spindle 75, into feed position, that is in engagement with the feed sleeve driving gear 94. To this end the illustrative tool is equipped with a push button 195 which operates through a suitable linkage to rock the yoke rearwardly, or counterclockwise as viewed in Figs. 15 and 16, so as to similarly shift the clutch element 96. As shown, the afore-mentioned linkage includes a link 196 which is pivoted intermediate its ends upon a pin 197 fixed to the bracket 193. The link 196 is operatively connected at its lower end to the inner end of the push button 195, and at its upper end the link 196 is rockably joined to a yoke operating link 198. Adjacent its forward end the link 198 is provided with an arcuate slot 198a for the reception of the yoke pin 192. The slot 198a is formed and disposed so that when the push button 195 is in its normal position (Fig. 15) the pin 192 can move freely therein from one end of the slot to the other as the yoke 160 is shifted between neutral, rapid traverse, feed, and return positions. However, upon pressing inwardly on the push button 195 the linkage 196, 198 is rocked rearwardly first drawing the forward end of the slot 198a into engagement with the pin 192 and, upon continuance of such movement, drawing the pin 192 and with it the yoke 160 rearwardly so as to shift the clutch element 96 into feed position. To facilitate manual shifting of the clutch element 96 the yoke operating link 198 is provided with an inclined cam surface 198b on the upper surface thereof which is engageable with a laterally projecting finger 191b formed on the latch arm 191, and it is effective to raise the arm against the action of the spring 194 so as to lift the notch 191a from the pin 192 and free the yoke 160 for movement by the link 198.

When the tool is thus started on its forward stroke (by means of the push button 195 and the linkage 196, 198) the cycle of operation including completion of the forward stroke at slow feed rate and the return of the spindle is effected as previously described herein.

It is contemplated that lubrication of the illustrative tool is to be effected by the introduction of lubricant thereto in the pressure fluid supply to the tool and to provide means for distributing the lubricant so introduced throughout the tool. The pressure fluid supplied for operating the instant tool is compressed air, thus the tool permits of so-called airline lubrication from an external reservoir (not shown). Accordingly, lubricant-laden air passes from the inlet chamber 46 to the motor 40 by way of the supply chamber 47, governor valve assembly 52 and supply passages 48. Air is exhausted from the rotor chamber of the motor 40 into an exhaust chamber 200 formed in the bottom of the housing 30. From the exhaust chamber 200 the lubricant-laden air is transmitted by way of ports 201 to the portion of the housing 30 within which the speed reduction gearing 60 is disposed so as to lubricate such gearing. From this portion of the tool housing 30, the air is supplied to the rear portion of the housing which encloses the spindle and feed sleeve drive gearing and the associated control mechanism by way of upwardly and rearwardly directed ports one of which is indicated at 202 in Fig. 1. Thus adequate lubrication for these components is provided. From this rear portion of the housing 30 the exhaust air, which by this time has deposited most of the lubricant which it carried, escapes to the atmosphere by way of exhaust ports 203 formed in the bottom of the housing beneath a deflector 204.

From the foregoing it can be seen that a tool constructed and arranged in accordance with the teachings of the present invention is of compact design permitting of incorporation in a portable device yet provides positive spindle feed at high thrust to insure spindle advance with each spindle revolution. Further, the particular construction and arrangement provides for unidirectional component rotation within a relatively narrow range of speed variation with the result that problems of inertia and momentum are minimized.

I claim:

1. A portable power operated tool comprising, in combination, a motor, a shaft drivingly connected to said motor, a spindle for mounting a cutting element and drivingly connected to said shaft for rotation thereby, a feed sleeve threaded upon said spindle, means interposed between said sleeve and said shaft for rotating said sleeve relative to said spindle to advance and retract said spindle, and arresting means for restraining said sleeve from rotation to allow said shaft to rapidly move therethrough.

2. A portable power operated tool comprising, in combination, a motor, a shaft drivingly connected to said motor, a spindle for mounting a cutting element, means for driving said spindle from said shaft, a feed sleeve mounted for rotation with respect to said spindle and having threaded connection therewith, means interposed between said shaft and said sleeve for driving said sleeve at a speed less than that of said spindle, means interposed between said shaft and said sleeve for driving said sleeve at a speed greater than that of said spindle, means for alternatively coupling said sleeve driving means to said sleeve for effecting feed and return movements of said spindle, and means for braking said sleeve to effect forward movement of said spindle at rapid traverse rate.

3. A portable power operated tool comprising, in combination, a motor, a shaft drivingly connected to said motor, a spindle for mounting a cutting element, means for driving said spindle from said shaft, a feed sleeve mounted for rotation to said spindle and having threaded connection therewith, drive gearing interposed between said shaft and said feed sleeve for driving said sleeve at a speed less than that of said spindle, a second drive gearing interposed between said shaft and said sleeve for driving said sleeve at a speed greater than that of said spindle, a clutch element for alternatively coupling said sleeve drive gearing to said sleeve so as to effect feed and return movements of said spindle, means for braking said sleeve to effect forward movement of said spindle at rapid traverse rate, and a control mechanism for first engaging said braking means with said sleeve for subsequently releasing said braking mechanism and for automatically coupling said sleeve to said first driving gearing so that forward movement of the spindle is initiated at rapid traverse rate and is subsequently effected at feed rate and said control mechanism including means for determining the forward stroke limit of said spindle and operative as an incident to the attainment of the forward stroke limit to effect disengagement of said clutch element from said first feed sleeve drive gearing and to shift the same into engagement with said second feed sleeve drive gearing so as to effect return movement of said spindle.

4. In a portable power operated tool the combination comprising a motor, a shaft drivingly connected to said motor, a spindle for mounting the cutting element, means for driving said spindle from said shaft, a feed sleeve mounted for rotation with respect to said spindle and having threaded connection therewith, a first gear train interposed between said shaft and said sleeve for rotating said sleeve at a speed less than that of said spindle, a second gear train interposed between said shaft and said sleeve for rotating said sleeve at a speed greater than that of said spindle, a clutch for alternatively coupling said gear trains to said feed sleeve, means for braking said sleeve and a control mechanism for controlling the operation of said braking means and said clutch, said control mechanism including means for applying said braking means to said sleeve whereby forward movement of said spindle is effected at rapid traverse rate, said control mechanism also including a control rod mounting a stop engageable in the forward movement of said spindle for releasing said braking means and for effecting engagement of said clutch with said first gear train so that forward movement of said spindle proceeds at feed rate, said control mechanism further including a second control rod mounting a forward movement limiting stop engageable by said spindle, said second control rod being effective upon engagement of said spindle with said second mentioned stop to effect disengagement of said clutch from said first gear train and engagement thereof with said second gear train so as to interrupt forward movement of said spindle and to initiate return movement thereof, said second control rod mounting a return movement limiting stop engageable by said spindle, said second control rod being effective upon engagement of said spindle with said third mentioned stop to effect disengagement of said clutch from said second gear train whereby to interrupt return movement of said spindle.

References Cited in the file of this patent

UNITED STATES PATENTS

| | | |
|---|---|---|
| 150,990 | Tufford | May 19, 1874 |
| 801,805 | Meissner | Oct. 10, 1905 |

FOREIGN PATENTS

| | | |
|---|---|---|
| 9,373 | Great Britain | Apr. 15, 1911 |